US008935333B2

(12) United States Patent
Beukema et al.

(10) Patent No.: US 8,935,333 B2
(45) Date of Patent: Jan. 13, 2015

(54) IMPLEMENTING MULTICAST ON A SYSTEM AREA NETWORK CHANNEL ADAPTER

(75) Inventors: Bruce Leroy Beukema, Hayfield, MN (US); Gregory Francis Pfister, Austin, TX (US); Renato John Recio, Austin, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1519 days.

(21) Appl. No.: 09/925,578

(22) Filed: Aug. 9, 2001

(65) Prior Publication Data

US 2003/0033426 A1     Feb. 13, 2003

(51) Int. Cl.
*G06F 15/16*    (2006.01)
*G06F 15/173*   (2006.01)
*G06F 15/167*   (2006.01)

(52) U.S. Cl.
USPC ............................ 709/205; 709/223; 709/213

(58) Field of Classification Search
None
See application file for complete search history.

(56) References Cited

U.S. PATENT DOCUMENTS

| | | | | |
|---|---|---|---|---|
| 5,440,548 A | * | 8/1995 | Denissen | 370/390 |
| 5,898,687 A | * | 4/1999 | Harriman et al. | 370/390 |
| 6,331,983 B1 | * | 12/2001 | Haggerty et al. | 370/400 |
| 6,349,097 B1 | * | 2/2002 | Smith | 370/390 |
| 6,477,149 B1 | * | 11/2002 | Okanoue | 370/312 |
| 6,615,039 B1 | * | 9/2003 | Eldering | 455/418 |
| 6,741,575 B1 | * | 5/2004 | Zhang et al. | 370/329 |
| 6,831,918 B1 | * | 12/2004 | Kavak | 370/395.52 |
| 6,847,638 B1 | * | 1/2005 | Wu et al. | 370/389 |
| 6,870,844 B2 | * | 3/2005 | Tuck et al. | 370/390 |
| 6,944,786 B2 | * | 9/2005 | Kashyap | 714/4 |

* cited by examiner

*Primary Examiner* — John B. Walsh
(74) *Attorney, Agent, or Firm* — Yee & Associates, P.C.; Steven L. Bennett

(57) ABSTRACT

An apparatus and method for implementing multicast in system area network channel adapters are provided. With the apparatus and method, a multicast packet is received in a channel adapter of an end node. The channel adapter determines which local queue pairs are party of the multicast group identified by a destination local identifier in the multicast data packet. Based on this determination, the channel adapter replicates the data packet and delivers a copy of the data packet to each local queue pair that is part of the multicast group.

28 Claims, 12 Drawing Sheets

Figure 6A

| | 608 | 609 | 610 | 611 | | 612 |
|---|---|---|---|---|---|---|
| 602 | DLID a | QPa | — | — | ... | — |
| 603 | DLID b | QPb | — | — | ... | — |
| 604 | DLID c | QPk | QPa | — | ... | — |
| | | | 601 ••• | | | |
| 605 | — | — | — | — | ... | — |
| 606 | DLID y | QPb | — | QPa | ... | — |
| 607 | DLID z | QPd | QPe | QPp | ... | QPx |

— Denotes an Available Entry in the Table

Figure 6B

| | 627 | 628 | 629 | 630 | | 631 |
|---|---|---|---|---|---|---|
| 621 | DLID a | QPa | — | — | ... | — |
| 622 | DLID b | QPb | QPf | QPg | ... | xyz |
| 623 | DLID c | QPk | QPa | — | ... | — |
| | | | 620 ••• | | | |
| 624 | — | — | — | — | ... | — |
| xyz 625 | X | QPa | QPd | QPw | ... | abc |
| abc 626 | X | QPs | QPe | — | ... | — |

— Denotes an Available Entry in the Table

X Denotes an Invalid DLID

IMPLEMENTING MULTICAST ON A SYSTEM AREA NETWORK CHANNEL ADAPTER

BACKGROUND OF THE INVENTION

1. Technical Field

The present invention is directed to an improved data processing system. More specifically, the present invention is directed to an apparatus and method for implementing multicast on a system area network channel adapter.

2. Description of Related Art

InfiniBand (IB), which is a form of System Area Network (SAN), defines a multicast facility that allows a Channel Adapter (CA) to send a packet to a single address and have it delivered to multiple ports. The InfiniBand architecture is described in the InfiniBand standard available at http://www.infinibandta.org which is hereby incorporated by reference.

With the InfiniBand architecture, the CA sending the multicast packet may be a Host Channel Adapter (HCA) or a Target Channel Adapter (TCA). A multicast packet is sent to all ports of a collection of ports called a multicast group. These ports may be on the same or different nodes in the SAN. Each multicast group is identified by a unique Local Identifier (LID) and Global Identifier (GID). The LID is an address assigned to a port which is unique within the subnet. The LID is used for directing packets within the subnet. The GID is a 128-bit identifier used to identify a port on a channel adapter, a port on a router, or a multicast group and is used when the packet is to be delivered outside of the originator's local subnet. The LID and GID are in the Local Route Header (LRH) and Global Route Header (GRH), respectively, of the IB packet. The LRH is present in all IB packets and is an address used for routing IB packets through switches within a subnet. The GRH is present in IB packets which are targeted to destinations outside the originator's local subnet and is used as an address for routing the packets when the packets traverse multiple subnets.

An IB management action via a Subnet Management Packet (SMP) is used when a node joins a multicast group, and at that time the LID of the port on the node is linked to the multicast group. A subnet manager then stores this information in the switches of the SAN using SMPs. The subnet manager via SMPs tells the switches the routing information for the various multicast groups, and the switches store that information, so that the switches can route the multicast packets to the correct nodes.

When a node is going to send a packet to the multicast group, it uses the multicast LID and GID of the group to which it wants the packet to be delivered. The switches in the subnet detect the multicast LID in the packet's Destination LID (DLID) field and replicates the packet, sending it to the appropriate ports, as previously set up by the subnet manager.

Within a CA, one or more Queue Pairs (QPs) may be registered to receive a given multicast address. IB allows for the number of QPs within a CA that can be registered for the same address to be only limited by the particular implementation. The registration process is done via the IB verb interface. The verb interface is an abstract description of the functionality of a Host Channel Adapter. An operating system exposes some or all of the verb functionality through its programming interface.

When the CA recognizes a multicast packet, the CA must somehow distribute the packet to all the registered QPs within that CA. This must be done in an efficient manner. How this is done is not specified by the InfiniBand Architecture (IBA).

In addition, the multicast facility is defined for unreliable IB operations, and as such, there is a set of rules that are defined by IBA that allows the discarding of undeliverable packets without notification to the originator. The assumption behind unreliable delivery is that there is some higher-level protocol that compensates for any lost packets, and by not having to notify the sender of each packet delivered, the overall network performance is increased by not using some of the available network bandwidth with acknowledgment packets.

SUMMARY OF THE INVENTION

The present invention provides an apparatus and method for implementing mulitcast in system area network channel adapters. With the apparatus and method of the present invention, a multicast packet is received in a channel adapter of an end node. The channel adapter determines which local queue pairs are party of the multicast group identified by a destination local identifier in the multicast data packet. Based on this determination, the channel adapter replicates the data packet and delivers a copy of the data packet to each local queue pair that is part of the multicast group.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6A shows an embodiment of a DLID to QP lookup table in the CA where there is a fixed max number of QPs that can be linked to a DLID;

FIG. 6B shows an embodiment of a DLID to QP lookup table in the CA where there is a flexible number of QPs that can be linked to a DLID;

DETAILED DESCRIPTION OF THE PREFERRED EMBODIMENT

Figure 1:
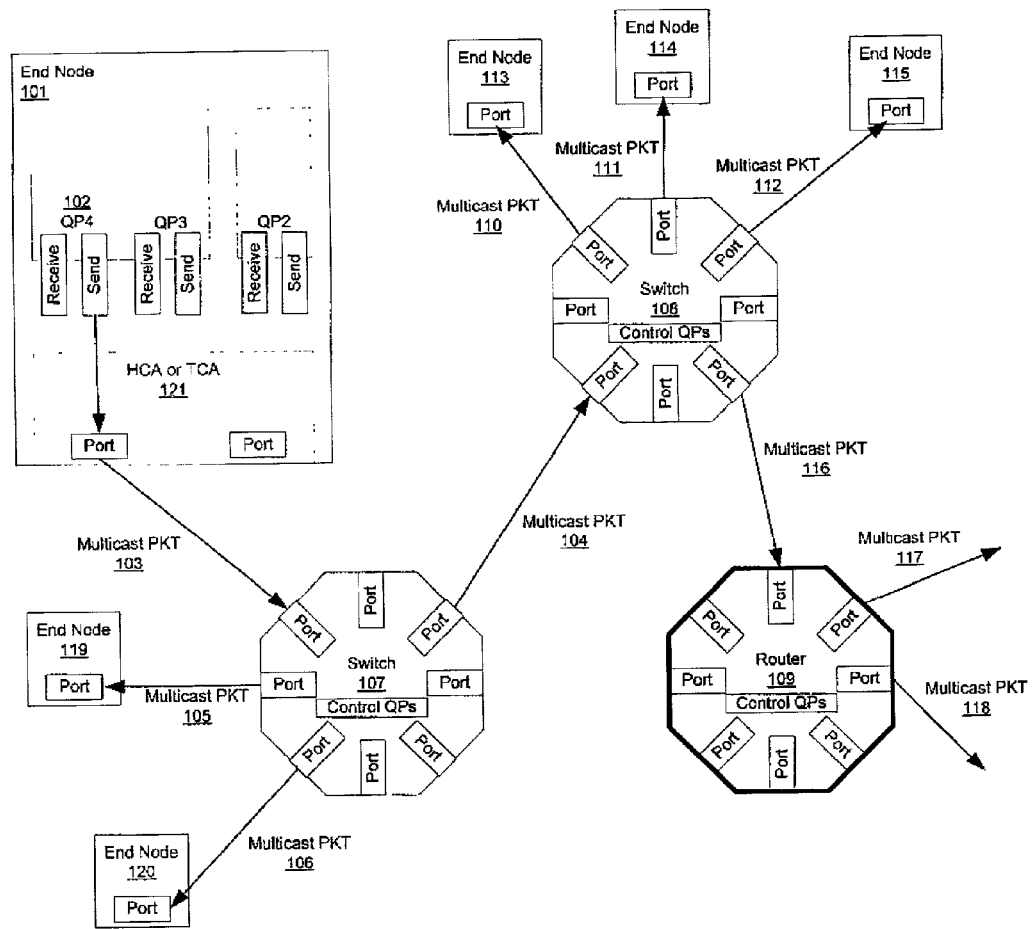
FIG. 1 shows an example of a multicast network in accordance with the present invention.

Referring to FIG. 1, this figure illustrates an example of a system area network (SAN) and the manner by which a multicast packet is routed through the SAN, which hereafter will be referred to as the network. The network is comprised of a plurality of end nodes 101, 113-115, and 119-120. These end nodes are coupled to one another via communication links (not shown), one or more switches 107-108, and one or more routers 109. A switch is a device that routes packets from one link to another of the same Subnet, using the Destination LID (DLID) in the Local Route Header (LRH) of the packet. A router is a device that routes packets between network subnets. An end node is a node in the network that is the final destination for a packet.

In the network shown in FIG. 1, an application in end node 101, which has a QP 102, may queue a "send" work request for a multicast packet into QP 102. When the channel adapter 121, which may be either a host channel adapter (HCA) or target channel adapter (TCA), processes this work request, the channel adapter 121 sends the multicast packet 103 out the port of the channel adapter 121 to switch 107.

Switch 107 decodes the DLID in the inbound packet's LRH to determine target output ports. Switch 107 replicates packet 103 and forwards the replicas to the appropriate output ports based on the DLID and its internal routing tables as packets 104-106.

Packets 105-106 reach end nodes 119-120, respectively, for processing at those end nodes. Packet 104 reaches switch 108 and gets processed in a similar manner to the processing in switch 107, with packets 110-112 and 116 being sent out its ports. Packets 110-112 reach end nodes 113-115, respectively, for processing at those end nodes. Packet 116 reaches router 109 where it decodes the inbound packet's Global Route Header (GRH) Global Identifier (GID) multicast address to determine target output ports. Packet 116 is then replicated by router 109 and forwarded to the output ports as packets 117-118.

Figure 2:
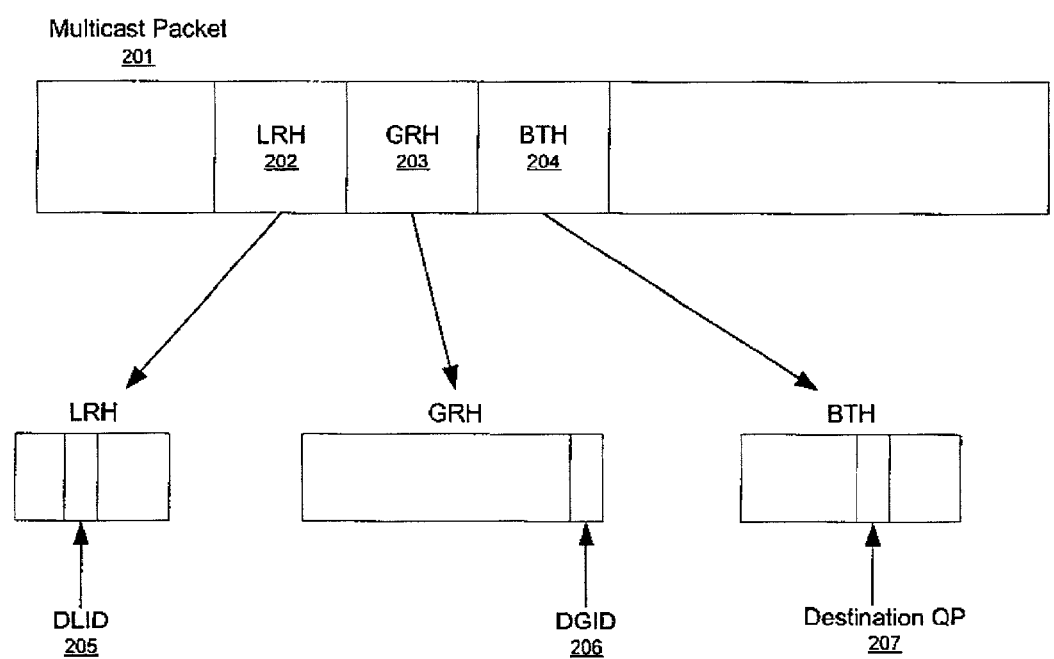
FIG. 2 shows the fields of the IB packet as related to multicast packets in accordance with the present invention.

Referring now to FIG. 2, this figure illustrates an exemplary multicast packet definition. Multicast packet 201 contains several fields including fields 202-204. The Local Route Header (LRH) field 202 exists in all multicast packets. The Global Route Header (GRH) field 203 exists in packets which cross multiple subnets (that is, those that pass through routers). The Base Transport Header (BTH) field 204 exists in all packets except raw data packets. The BTH contains information used for processing the packet at the end node, such as the number of the QP which is to receive the packet.

Of particular interest to the present invention are the DLID subfield 205 of the LRH field 202, the Destination GID (DGID) subfield 206 of the GRH field 203, and the Destination Queue Pair (QP) number subfield 207 of the BTH field 204. For multicast packets, the DLID and DGID fields contain the LID and GID for the multicast group to which the multicast packet is targeted, and the Destination QP field contains the number 0xFFFFFF which is a unique QP number identifying this as a multicast operation (as opposed to a specific QP destination within the end node). For multicast packets, the range of LID addresses that are reserved by IB for multicast packets is 0xC000 to 0xFFFE.

It should be noted that, as previously mentioned, the LID is used for routing the packet to the end node. For non-multicast packets, the QP is used for routing within the end node. However, for multicast packets, the method for routing within the end node is different (that is, as defined by the present invention). Therefore, the QP unique number of 0xFFFFFF indicates to the end node that it should not route the packet as "normal" but to use the multicast method of the present invention instead.

Figure 3:
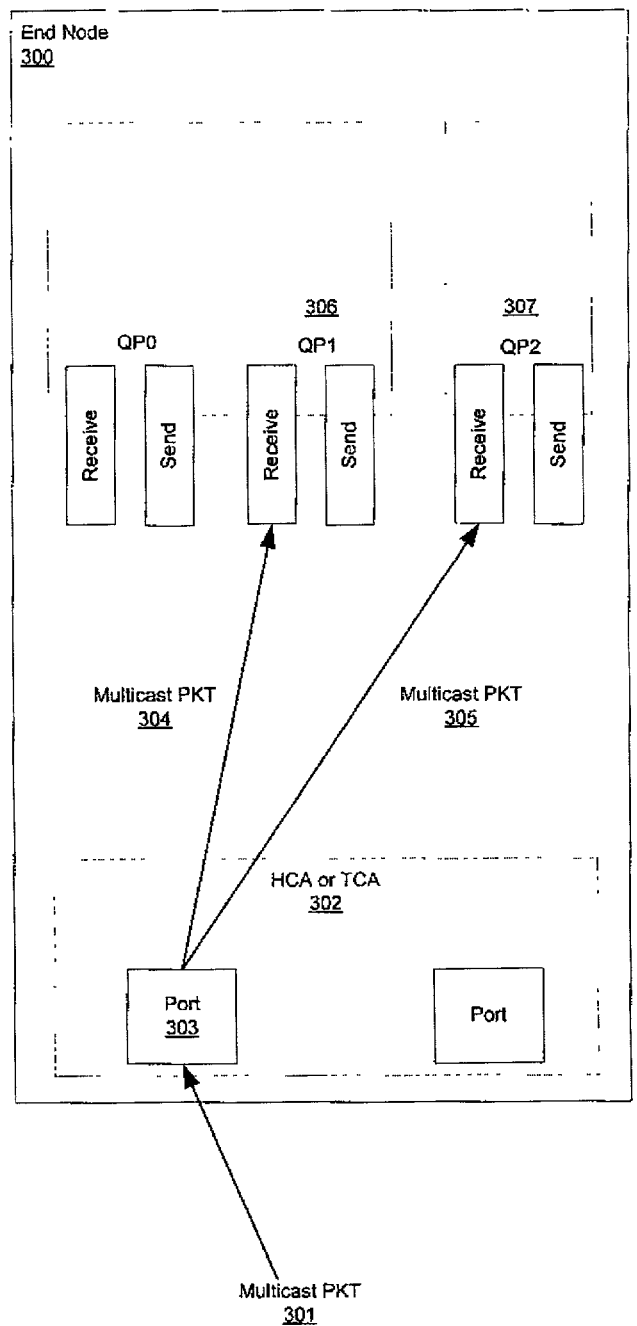
FIG. 3 shows the delivery of a multicast packet within an end node when the end node is different than the source node.

Referring now to FIG. 3, this figure illustrates an example of a packet delivery mechanism within an end node, wherein the end node is different from the source node for the packet. As shown in FIG. 3, the packet 301 comes into the destination end node 300 channel adapter (CA) 302 at port 303. As previously mentioned, the end node channel adapter may be a host channel adapter (HCA) or a target channel adapter (TCA).

The CA 302 examines the header information of the multicast packet and makes the determination that this is a multicast packet based on the header information. The CA 302 then determines which QPs are part of this multicast group. The CA then replicates the packet as packet 304 and 305 and delivers one internally replicated copy of the packet to each locally managed QP 306-307 participating in the indicated multicast group. As will be described in greater detail hereafter, the present invention provides a mechanism and method for making the determination as to which QPs receive the multicast packet 301, i.e. the target QPs, and a mechanism for delivery of the packet to the target QPs.

When the source end node, i.e. the end node that originally generated the multicast packet, contains QPs which are targets of a send operation, the end node must internally replicate the packet and deliver it to each participating QP. Replication occurs within a channel interface and may be performed either in hardware or software.

Figure 4:
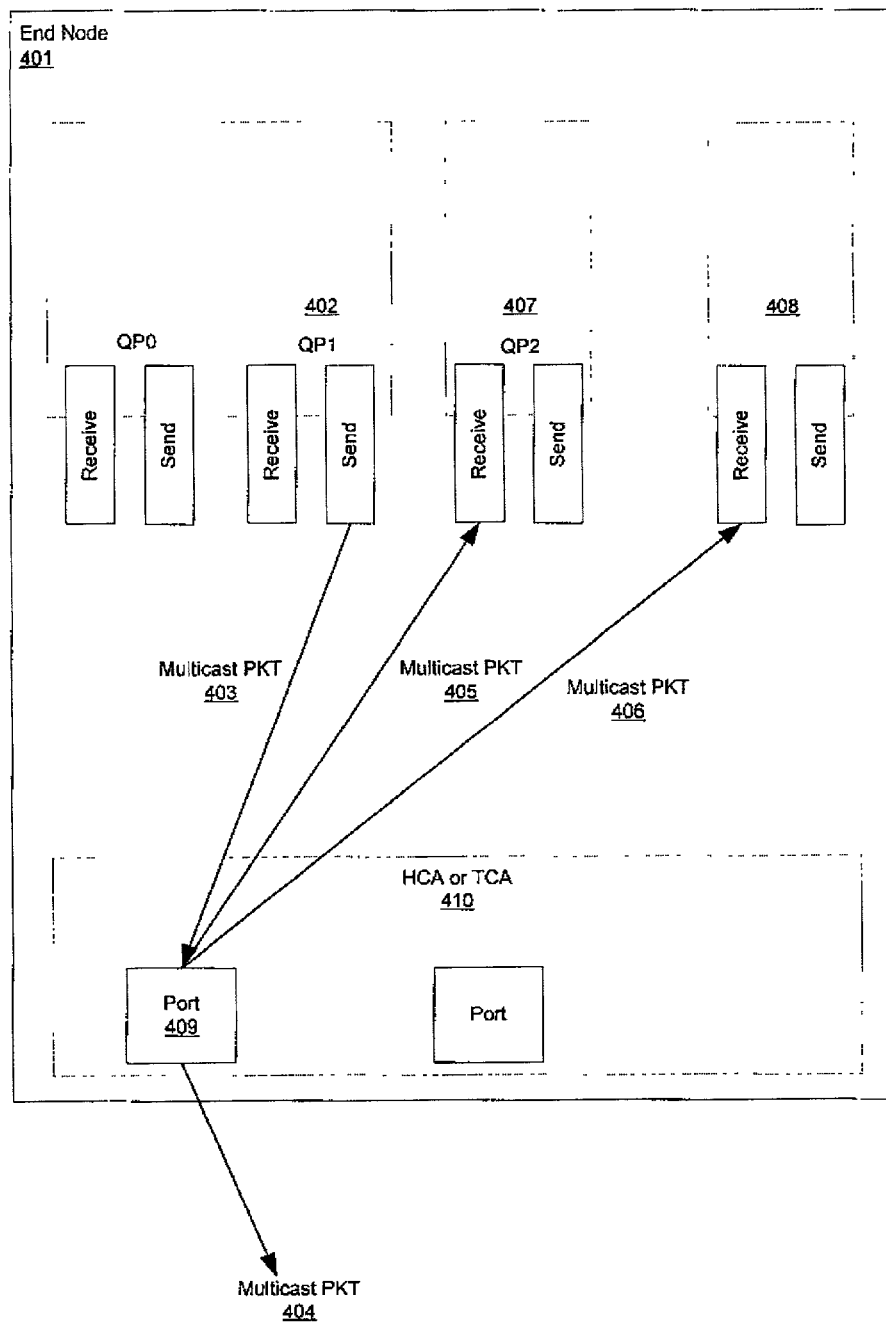
FIG. 4 shows the delivery of a multicast packet within an end node when the end node is same node as the source node.

Referring now to FIG. 4, this figure illustrates an example of a packet delivery mechanism within an end node, wherein the end node is the same as the source node for the packet. An application in end node 401 which has a QP 402, queues a "send" work request for the multicast packet into QP 402. When the CA (HCA or TCA) 410 processes this work request, the CA 410 sends multicast packet 404 out the port 409 of the CA 410.

In addition, the CA 410 determines that this same end node contains QPs which are targets of the operation (that is, which are part of the same multicast group). The CA 410 makes the determination as to which QPs are part of this multicast group. The CA 410 then replicates the packet as packet 405-406 and delivers one internally replicated copy of the packet to each locally managed QP 407-408 participating in the indicated multicast group. The mechanism and method for making the determination as to which QPs receive the multicast packet and the mechanism for making the delivery of the packet to these QPs in accordance with the present invention, is described in greater detail hereafter.

Figure 5:
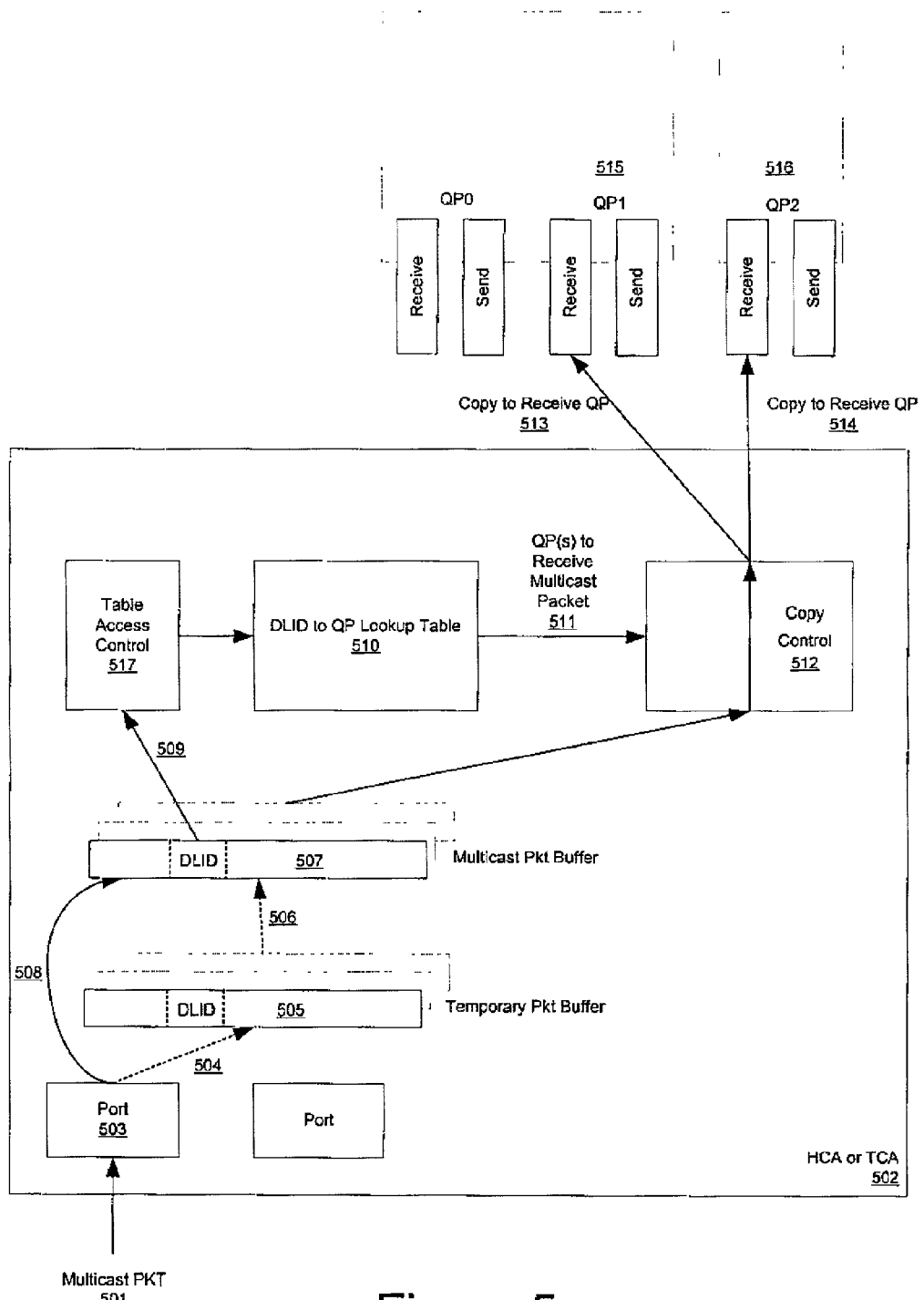
FIG. 5 shows a greater level of detail relative to the delivery of a multicast packet from the receiving port of the CA to the delivery to the receive queue of the CA.

Referring to now FIG. 5, this figure illustrates an exemplary mechanism for distribution of multicast packets to QP destinations in accordance with the present invention. Multicast packet 501 is received by the CA 502 at port 503. In one embodiment, the port 503 logic moves the packet, as in 504, to a temporary packet buffer 505, as are all other incoming packets. In another embodiment, the port 503 logic decodes the packet while it is incoming, determines it is a multicast packet, and transfers it directly to the temporary multicast packet buffer 507, as shown in 508.

If the packet is moved to the general temporary packet buffers 505, the CA 502 logic decodes the packet, determines the packet to be a multicast packet, and moves it to the temporary multicast packet buffers 507, as shown in 506. The determination of the packet as a multicast packet is made by comparing the DLID to an acceptable multicast range of 0×C000 to 0×FFFE or by comparing the number in the destination QP field in the BTH of the received packet to the multicast QP number, 0×FFFFFF.

In either of the two above embodiments, the multicast packet 501 is placed in the temporary multicast packet buffer 507. In the first embodiment, the decoding of the multicast packet 501 is performed by the port 503 logic. In the second embodiment, the decoding of the multicast packet 501 is performed by the CA 502 logic. Once the multicast packet is in a temporary multicast packet buffer 507, it is ready for multicast processing.

It is important to note that if there is an error in the process of bringing the multicast packet 501 into the CA 502, for example a buffer full condition on temporary buffers 505 or 507, it is defined as acceptable by the IB architecture (IBA) for the CA 502 to drop the delivery of the packet due to the unreliable delivery method that is being used for multicast packet delivery. This does not preclude the CA 502 from performing some recovery processing to try to avoid dropping the packet.

Once the multicast packet 501 is in the temporary multicast packet buffer 507, a determination is made as to which QPs are attached to the given multicast group's DLID. The multicast packet 501 is then copied to the appropriate QPs. Since multicast packets have a lower occurrence than regular packets, i.e. non-multicast packets, and because they are defined to be unreliable delivery, which means that they can be dropped without informing the sender, it is possible to perform the following operation in either the CA 502 hardware or in the software which is controlling the CA 502.

The DLID of the multicast packet in the temporary multicast packet buffer 507 is passed, in 509, to a table access control mechanism 517. The table access control mechanism 517 accesses a DLID to QP lookup table 510 and determines the QPs that are to receive this packet, if any, and passes the QP identifiers 511, which in the exemplary embodiments are numbers but are not limited to such, to the copy control mechanism 512. The method used to access the DLID to QP lookup table 510 is different based on the particular embodiment of DLID to QP lookup table 510. Two embodiments of the DLID to QP lookup table 510 will be described hereafter, but other embodiments of this table are possible.

Once the QP identifiers 511 are passed to the copy control 512, the copy control 512 copies the packets to the appropriate QPs, as shown in 513-514. In the depicted example, the packets are copied to QPs 515-516. When the copy is complete and the queue entries in the QPs 515-516 are marked as valid, the copy control 512 removes the multicast packet from the temporary mulitcast packet buffer 507 and marks that buffer as available.

It is important to note that if there is an error in the process of copying the multicast packet from the temporary multicast packet buffer 507 to the QPs 515-516, for example a QP 515-516 full condition, it is defined as acceptable by the IBA for the CA 502 to drop delivery of the packet to one or more QPs due to the unreliable delivery method that is being used for multicast packet delivery. This does not preclude the CA 502 from performing some recovery processing to try to avoid dropping the packet.

Referring now to FIGS. 6A and 6B, two embodiments of the DLID to QP lookup table 510 are shown. In FIG. 6A, there are a fixed number of element columns 609-612 per DLID column 608. Each element 609-612 in a row 602-607 can be used to store a QP identifier, e.g., a QP number, to be associated with a multicast group, as indicated by the multicast group DLID 608. Each row 602-607 then represents a different multicast group.

With this embodiment, given that there are a fixed number of columns per DLID, the number of QPs that can be linked per multicast group is a fixed number for any given CA at any given time. Software in the end node requests an attachment of a QP to a multicast group, via the Attach QP to Multicast Group IB verb, which is defined in the IB standard. If no room exists in the DLID's row, then an error is returned to the software request.

In FIG. 6B, there are a flexible number of element columns 628-631 per DLID column 627, because the last element in a row 621-626 can be used as a link to another row in the table when the number of QPs attached to a given DLID exceeds the number of elements in the row. Each element 628-631 in a row 621-626 can be used to store a QP identifier to be associated with a multicast group, as indicated by the multicast group DLID 627. Each row 621-626 then represents a different multicast group or a continuation of another multicast row in the table. Rows which are continuations will have their DLID column 627 set to an invalid multicast DLID. Rows that are continued will have a unique identifier in one column, such as the last column 631 for example, which represents the continuation row. The identifier points to the continuation row but does not point to a valid QP.

The fact that the unique identifier is not a valid QP number allows the table access mechanism or method 517 to tell a QP from a link. For example, column 631 could have the high-order bit of the identifier set to a 0b1 to indicate that this is a link and not a QP. In addition, there must be a unique identifier to indicate that there is neither a QP identifier or a link in that location, for example, a value of all binary 1's may be used.

Given that there is not a fixed number of QPs that can be linked per multicast group, a flexible number of QPs per multicast group can be supported by the CA at any given time with this embodiment. The tradeoff is that for each extra row added for one multicast group, the total number of multicast groups supportable by the given CA implementation is reduced by one. Software in the end node requests an attachment of a QP to a multicast group, via the Attach QP to Multicast Group IB verb. If no room exists in the DLID's row and if another row is available in the table, then a linked row is added, otherwise an error is returned to the software request.

Figure 7:
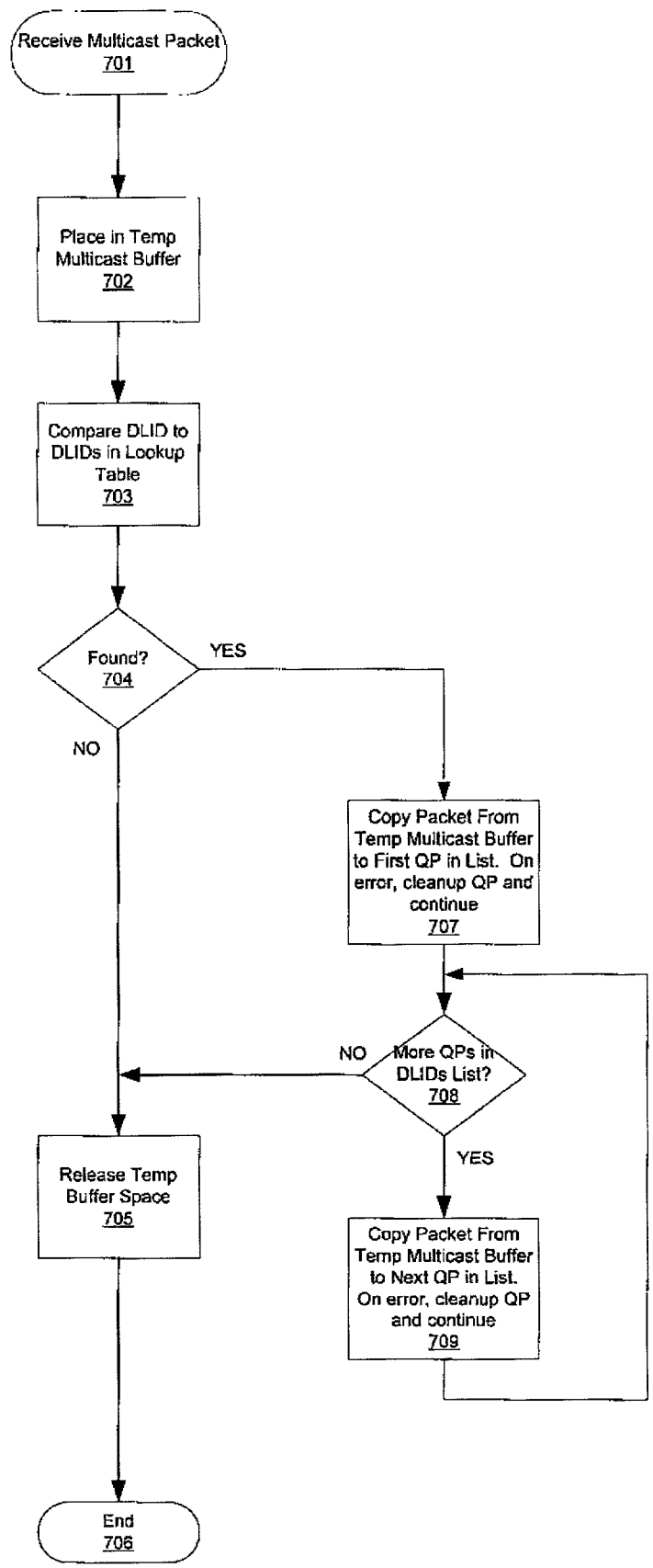
FIG. 7 is a flowchart outlining an exemplary operation of the multicast packet in the CA.

FIG. 7 is a flowchart outlining an exemplary operation of the present invention when receiving a multicast packet. As shown in FIG. 7, the operation starts when a multicast packet is received (step 701). The multicast packet is placed in a multicast packet buffer 507 (step 702). The placement of the multicast packet in the multicast packet buffer 507 may be performed directly by the port logic or may be performed by the CA logic following the placement of the multicast packet in the general temporary buffer 505 by the port logic.

The DLID is then used by the table access control 517 to lookup the DLID in the DLID to QP lookup table 510 (step 703). A determination is made as to whether the DLID is found in the lookup table 510 (step 704). If the DLID is not found, then the temporary buffer space is released (step 705) and the operation ends (step 706).

If the DLID was found in the DLID to QP lookup table 510, then the packet is copied from temporary multicast packet buffer 507 to the QP as indicated by the first QP table entry in DLID to QP lookup table 510 (step 707). A determination is then made as to whether or not there is another QP attached to the given multicast group, as indicated by another entry in the DLID to QP lookup table 510 (step 708). If so, the copying of the multicast packet to other QPs continues (step 709).

If there are no more QPs in the DLID's list, the temporary buffer space is released (step 705) and the operation ends (step 706).

Figure 8:
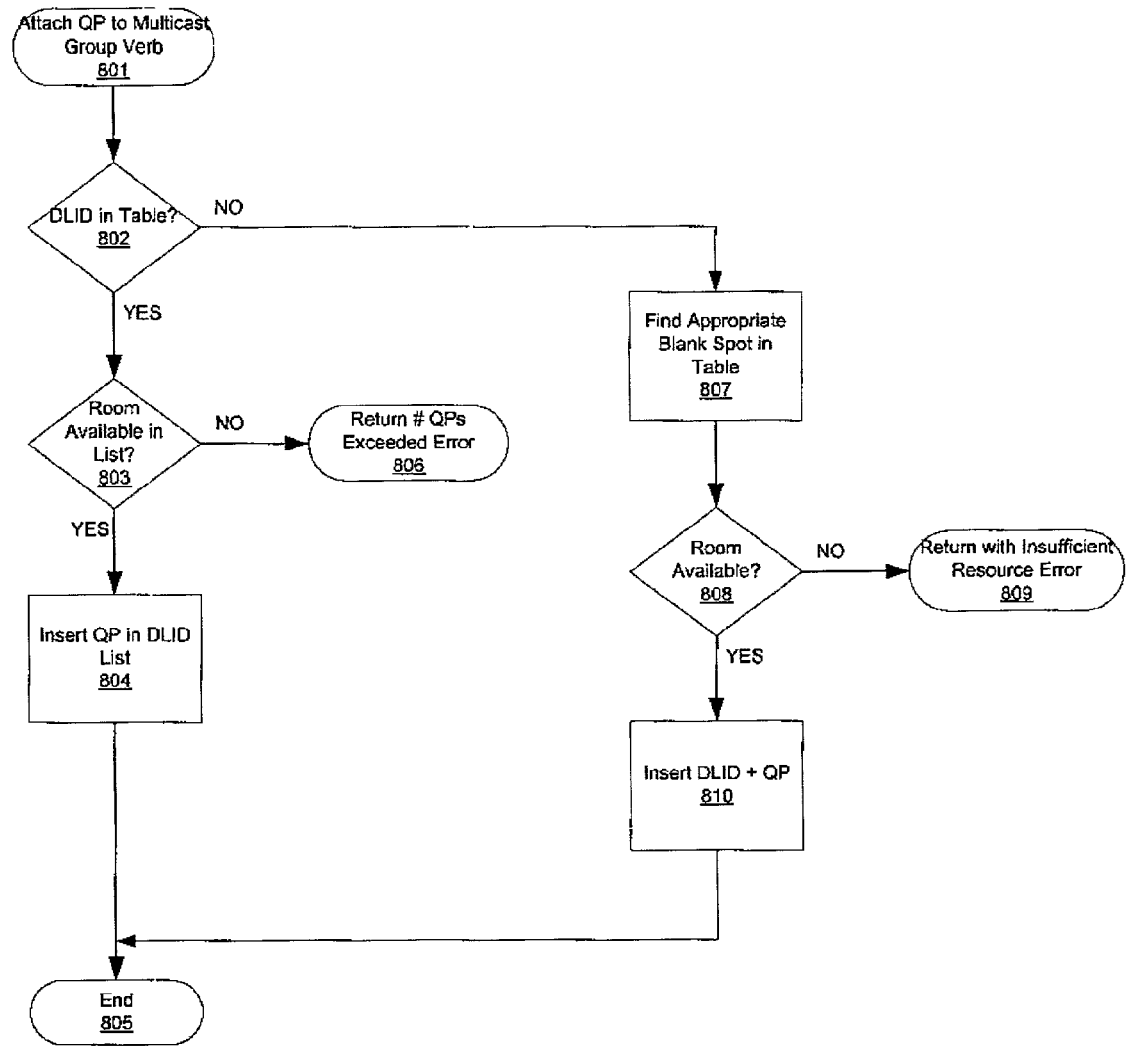
FIG. 8 is a flowchart outlining an exemplary operation for the Attach QP verb which links a QP to a DLID, for the case where there is a fixed maximum number of QPs in the CA which can be linked to a given DLID at one time.

FIG. 8 is a flowchart outlining an exemplary operation of the present invention when executing the Attach QP to Multicast Group IB verb, where the DLID to QP table 510 embodiment is as shown in FIG. 6A. The operation starts with the calling of the Attach QP to Multicast Group verb (step 801). Two of the parameters passed with that call of the Attach QP to Multicast Group verb is the DLID of the multicast group and the QP number to attach to that multicast group.

The operation then examines the DLID column 608 of each row 602-607 to determine if an entry for the DLID is in the table (step 802). If the DLID is not in the table yet, a blank row in the table is attempted to be found (step 807). A determination is made as to whether any rows are available in the table (step 808). If it is determined that there are no rows available, then the operation returns to the caller with an "insufficient resource" error (step 809). If a blank row is found, then the DLID from the verb call is inserted into the DLID column 608 of the row, and the QP from the verb call is inserted into the next column 609 of the table (step 810).

If the operation finds a DLID in column 608 (step 802), then the operation examines the entries in the row to determine if there are any available QP entries 609-612 (step 803). In one embodiment, empty entries are indicated by all binary 1's in the entry, in another embodiment this might be indicated by any QP identifier which is larger than the number of QPs implemented by the CA. If there are no available entries for linking the QP to the DLID, then the operation returns to the caller with an "number of QPs exceeded" error (step 806).

If room is available, then the QP number is inserted into the available space in the DLID's row (step 804) and then the operation returns to the caller with a successful return code (step 805).

Figure 9:
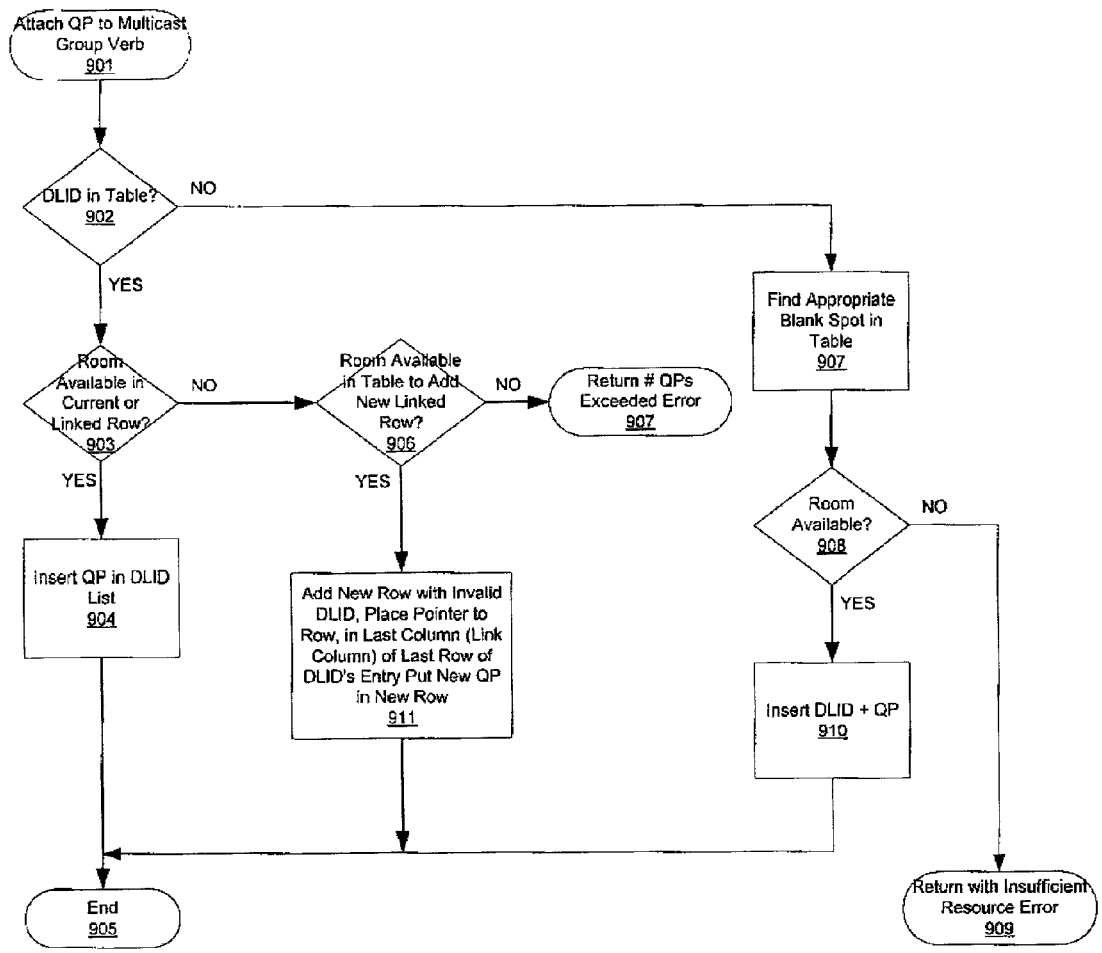
FIG. 9 is a flowchart outlining an exemplary operation for the Attach QP verb which links a QP to a DLID, for the case where there is a flexible maximum number of QPs in the CA which can be linked to a given DLID at one time.

FIG. 9 is a flowchart outlining an exemplary operation of the present invention for executing the Attach QP to Multicast Group IB verb, wherein the DLID to QP table 510 embodiment is as shown in FIG. 6B. As shown in FIG. 9, the operation starts with a call of the Attach QP to Multicast Group verb (step 901). Two of the parameters passed with that call is the DLID of the multicast group and the QP number to attach to that multicast group.

The operation examines the DLID column 627 of each row 621-626 to determine if an entry for the DLID is in the table (step 902). If the DLID is not in the table yet, a blank row in the table is attempted to be found (step 907). If it is determined that there are no rows available (step 908), then the operation returns to the caller with an "insufficient resource" error (step 909).

If a blank row is found (step 908), then the DLID from the verb call is inserted into the DLID column 627 of the row and the QP from the verb call is inserted into the next column 628 of the table (step 910). The operation then ends (step 905) by returning to the caller with a successful return code.

If the operation finds a DLID in column 627 (step 902), then the operation examines the entries in the row, including rows that are linked together for that DLID, to determine if there are any available QP entries 628-631 (step 903). In one embodiment, empty entries are indicated by all binary 1's in the entry. In another embodiment this might be indicated by any QP number which is larger than the number of QPs implemented by the CA. In any case, a series of QP numbers have to be reserved to indicate a link for a link pointer for column 631. Any number of rows may be linked together for a DLID by placing the row of the next row in the chain for the DLID in column 631 of the row.

If there are no available entries in the row or currently linked rows, if any, for attaching the QP to the DLID (step 903), then the DLID to QP table 510 is searched to see if there are any blank rows that can be linked into the current DLID list (step 906). If no free rows exist, then the operation returns to the caller with a "number of QPs exceeded" error (step 907).

If there is room available for a new row (step 906), then the new row is marked with an invalid DLID number, the QP number from last column of the chain for the DLID 631 is moved to the first available QP position 628 of the new row, a pointer to the new row is placed into the last column of the previous row for the DLID, and the new QP number is added into the first available QP position, column 629, of the new row (step 911). The operation then ends (step 905) by returning to the caller with a successful return code.

If room is available in step 903, then the QP number is inserted into the available space in the DLID's row (step 904). The operation then ends (step 905) by returning to the caller with a successful return code.

Figure 10:
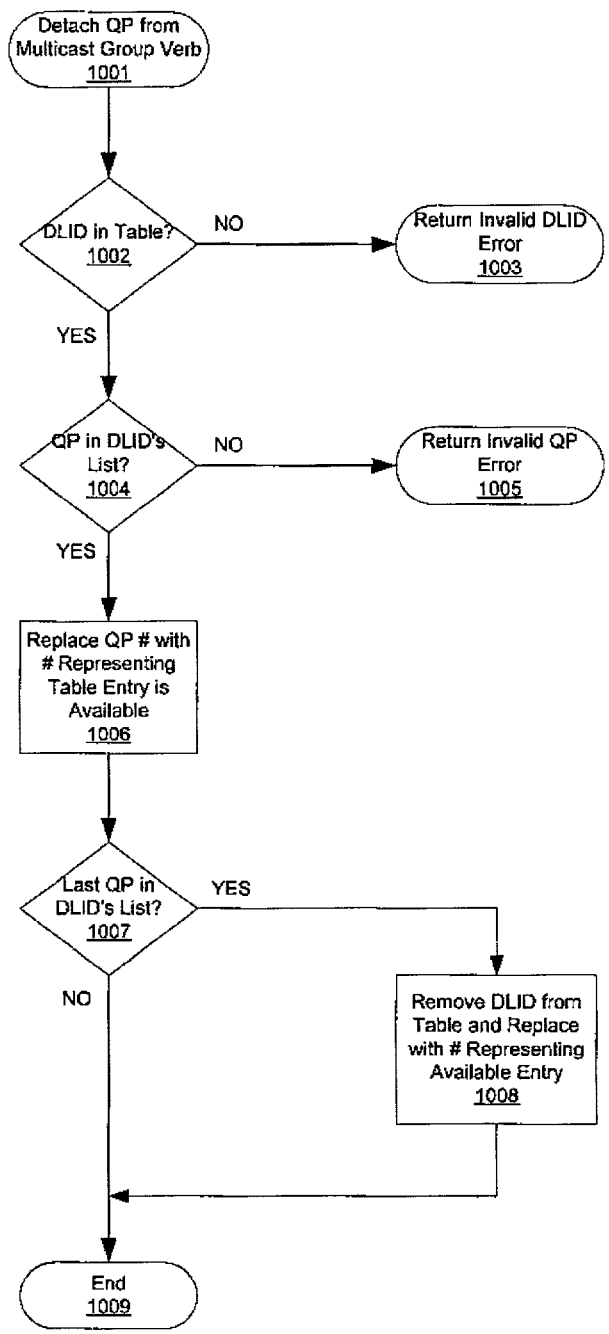
FIG. 10 is a flowchart outlining an exemplary operation for the Detach QP verb which unlinks a QP from a DLID, for the case where there is a fixed maximum number of QPs in the CA which can be linked to a given DLID at one time.

Referring now to FIG. 10, an exemplary process used in executing the Detach QP from Multicast Group IB verb is shown, where the DLID to QP table 510 embodiment is as shown in FIG. 6A. The process starts with a call of the Detach QP from Multicast Group verb (step 1001). Two of the parameters passed with that call is the DLID of the multicast group and the QP number to detach from that multicast group.

The process then examines the DLID column 608 of each row 602-607 to determine if an entry for the DLID is in the table (step 1002). If the DLID is not in the table, then the process returns to the caller with an "invalid DLID" error (step 1003). If the DLID is found in the table, then the table is examined to see if the QP number in the Detach QP from Multicast Group call is linked to the DLID in table 510 (step 1004). If the QP number is not in the table for the given DLID, then the process returns to the caller with an "invalid QP number" error (step 1005).

If the QP number is in the DLID's list (step 1004), the QP number is replaced with a QP number indicating that the entry is available, which is some invalid QP number (step 1006). In another embodiment, this available entry may be moved to the last entry of the row by moving the last valid entry of the row to the spot that was vacated by the current QP number being removed and the available QP number being put in the place of the QP number just moved.

Thereafter, the row is examined to determine if the last entry for the DLID was removed (step 1007). If so, the DLID row is removed from the table by inserting an invalid DLID in the DLID column 608 (step 1008). The process then returns to the caller with a successful return status (step 1009).

If there still are one or more QPs remaining attached to the DLID after removal of the QP (step 1007), then the process returns to the caller with a successful return status (step 1009).

Figure 11:
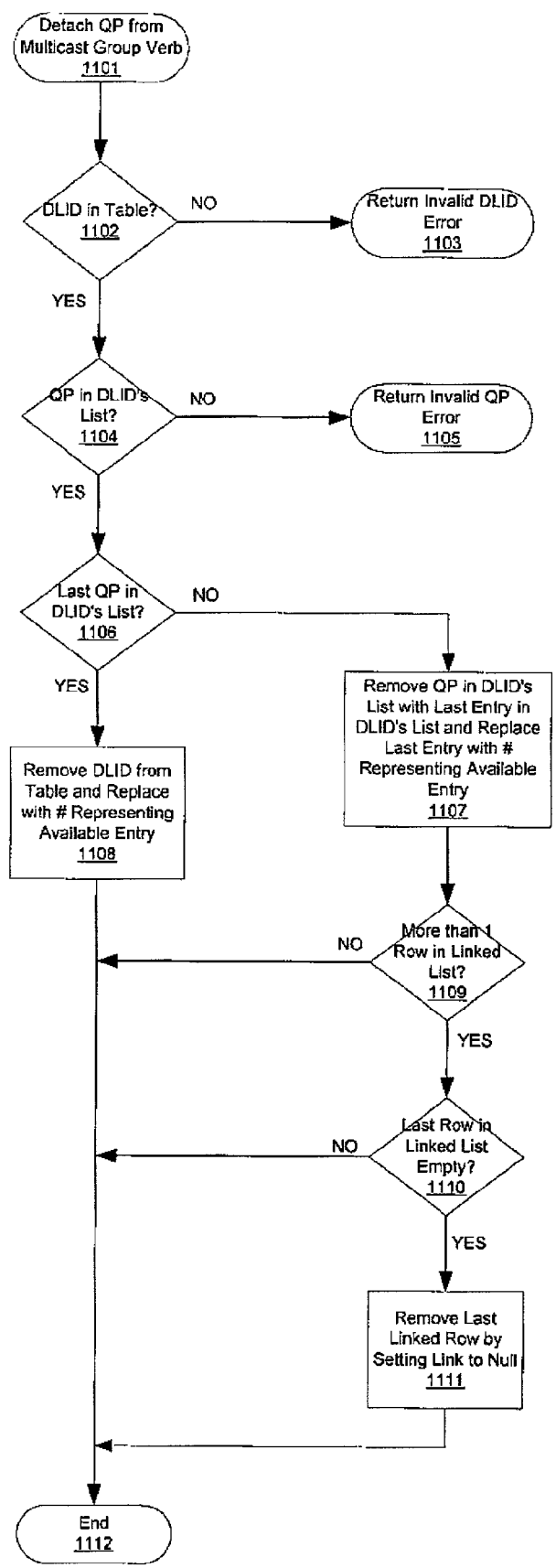
FIG. 11 is a flowchart outlining an exemplary operation for the Detach QP verb which unlinks a QP from a DLID, for the case where there is a flexible maximum number of QPs in the CA which can be linked to a given DLID at one time.

Referring now to FIG. 11, an exemplary process used in executing the Detach QP from Multicast Group IB verb is shown, where the DLID to QP table 510 embodiment is as shown in FIG. 6B. The process starts with a call of the Detach QP from Multicast Group verb (step 1101). Two of the parameters passed with that call is the DLID of the multicast group and the QP number to detach from that multicast group.

The process examines the DLID column 627 of each row 621-626 to determine if an entry for the DLID is in the table (step 1102). If the DLID is not in the table, then the process returns to the caller with an "invalid DLID" error (step 1103).

If the DLID is found in the table (step 1102), then the table is examined to see if the QP number in the Detach QP from Multicast Group call is linked to the DLID in table 510 (step 1104).

If the QP number is not in the table for the given DLID, then the process returns to the caller with an "invalid QP number" error (step 1105). If the QP is in the list, a check is performed to see if this is the last QP in the DLID's list (step 1106).

If this is the last QP in the DLID's list, the DLID row is removed from the table by replacing the DLID number in the DLID column 627 with an invalid DLID number (step 1108) and the process returns to the caller with a successful return status (step 1112).

If the determination is made that there are other QPs in the list (step 1106), then the QP number is replaced by last entry in the DLID's list of attached QPs by moving the last valid entry of the list to the spot that was vacated by the current QP number being removed and the available QP number put in place of the QP number that was moved (step 1107). Thereafter, a check is performed to see if there is more than one row linked in for this entry (step 1109). If not, then processing is complete and the process returns to the caller with a successful return status (step 1112).

If there is more than one row in the table for this DLID (step 1109), then a check is performed to see if the last row in the linked list of rows is now empty (step 1110). If not, then processing is complete and the process returns to the caller with a successful return status (step 1112). If the last row is now empty (step 1110), then the last row is removed by setting the link in the last column of the previous row in the chain of rows to a null link (step 1111). The process then returns to the caller with a successful return status (step 1112).

Figure 12:
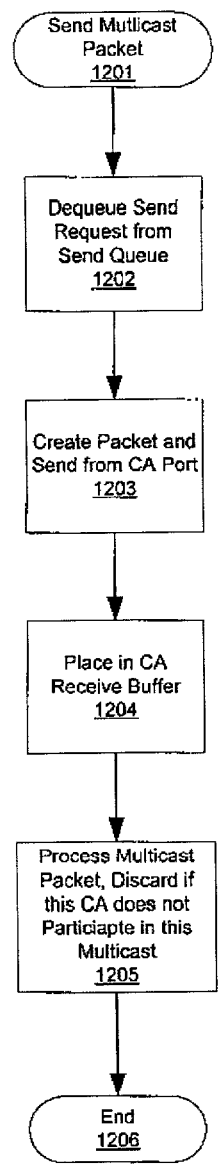
FIG. 12 is a flowchart outlining an exemplary operation for a Send multicast packet operation.

FIG. 12 is a flowchart outlining an exemplary Send operation according to the present invention. The operation starts with an invoking of a Send operation (step 1201). A previously queued Send multicast request is dequeued from the Send queue (step 1202) and the Send operation is performed (step 1203). The CA not only sends the Send packet, it must also process the multicast packet if the CA participates in the multicast group addressed by the packet, as was shown in FIG. 4. In one embodiment, this is done by checking the DLID first in the DLID to QP table 510 before placing the packet in the CA's temporary receive packet buffer 505, and not placing it in the buffer unless the DLID of the Send is determined to be in the DLID to QP table 510. In another embodiment, the Send packet is copied directly from the Send queue to any appropriate receive queues and not removed from the Send queue until it is determined that the DLID is in the DLID to QP table 510 and the Send packet has been copied directly from the Send queue to the appropriate receive queues, as determined by the DLID to QP table 510.

In a preferred embodiment, the design of the CA is simplified by placing all Send requests from the CA which are multicast packets into the temporary packet buffer 505 and letting the normal multicast lookup process when the multicast group is not found in the DLID to QP lookup table, as was shown in 704 and 705. Therefore, in block 1204, the multicast packet is placed into the CA's receive temporary packet buffer 505 and is processed like any other multicast packet (step 1205). Having sent the packet and processed it internally to the CA, the Send processing is complete (step 1206).

Thus, the present invention provides an apparatus and method for implementing the sending and receiving of multicast data packets on a system area network channel adapter. The invention allows for efficient correlation and copying of multicast packets to appropriate queue pairs and allows for flexibility in implementations relative to the size of lookup tables, with allowance for optimization relative to the number of queue pairs attachable per QP versus the number of multicast groups supported.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of multicasting a data packet in a system area network, comprising:

receiving the data packet, wherein the data packet includes an identifier of a multicast group that identifies the multicast group;

responsive to determining that the received data packet is a multicast packet based on the identifier of the multicast group included in the received data packet, identifying a plurality of queue pairs that are members of the multicast group that is identified by the identifier of the multicast group that is included in the received data packet; and delivering the data packet to each of the plurality of queue pairs that are identified as being members of the multicast group that is identified by the identifier of the multicast group that is included in the received data packet, wherein the data packet is received in a channel adapter of an end node, wherein the data packet originates from the end node, and wherein delivering the data packet to each of the plurality of queue pairs that are identified as being members of the multicast group that is identified by the identifier of the multicast group that is included in the received data packet includes replicating the data packet for each of the plurality of queue pairs that are internal to the end node, wherein the data packet does not identify the plurality of queue pairs that are internal to the end node.

2. The method of claim 1, wherein the data packet is received in a channel adapter of an end node, the end node being a final destination for the data packet within the system area network.

3. The method of claim 1, wherein each of the plurality of queue pairs comprises a send queue and a receive queue, and wherein identifying the plurality of queue pairs that are members of the multicast group that is identified by the identifier of the multicast group that is included in the received data packet includes determining which queue pairs are associated with a destination local identifier in the data packet.

4. The method of claim 1, further comprising:
    decoding the data packet; and
    storing the data packet in a multicast packet buffer.

5. The method of claim 4, wherein decoding the data packet and storing the data packet in the multicast packet buffer are performed by port logic.

6. The method of claim 4, wherein decoding the data packet and storing the data packet in the multicast packet buffer are performed by channel adapter logic.

7. The method of claim 1, wherein receiving the data packet includes:
    determining if there is an error in receipt of the data packet; and
    if there is an error in receipt of the data packet, dropping the data packet.

8. The method of claim 1, wherein delivering the data packet to each of the plurality of queue pairs that are members of the multicast group includes:
    determining if there is an error in delivering the data packet to each of the plurality of queue pairs; and
    dropping the data packet if an error occurs during delivery of the data packet to each of the plurality of queue pairs.

9. A method of multicasting a data packet in a system area network, comprising:
    receiving the data packet, wherein the data packet includes an identifier of a multicast group;
    identifying a plurality of queue pairs that are members of the multicast group, wherein each of the plurality of queue pairs comprises a send queue and a receive queue, and wherein identifying the plurality of queue pairs includes determining which queue pairs are associated with a destination local identifier in the data packet; and
    delivering the data packet to each of the plurality of queue pairs that are members of the multicast group, wherein determining which queue pairs are associated with the destination local identifier includes using a destination local identifier to queue pair lookup table.

10. The method of claim 9, wherein the destination local identifier to queue pair lookup table contains a flexible number of queue pair identifier columns per destination local identifier.

11. The method of claim 10, wherein one of the queue pair identifier columns associated with the destination local identifier serves as a link to another entry in the destination local identifier to queue pair lookup table.

12. The method of claim 9, wherein the destination local identifier to queue pair lookup table contains a fixed number of queue pair identifier columns per destination local identifier.

13. A computer program product comprising instructions stored in a non-transitory computer readable medium for multicasting a data packet in a system area network, the instructions comprising:
    first instructions for receiving the data packet, wherein the data packet includes an identifier of a multicast group that identifies the multicast group;
    second instructions, responsive to determining that the received data packet is a multicast packet based on the identifier of the multicast group included in the received data packet, for identifying a plurality of queue pairs that are members of the multicast group that is identified by the identifier of the multicast group that is included in the received data packet; and
    third instructions for delivering the data packet to each of the plurality of queue pairs that are identified as being members of the multicast group that is identified by the identifier of the multicast group that is included in the received data packet, wherein the data packet is received in a channel adapter of an end node, wherein the data packet originates from the end node, and wherein the third instructions for delivering the data packet to each of the plurality of queue pairs that are identified as being members of the multicast group that is identified by the identifier of the multicast group that is included in the received data packet include instructions for replicating the data packet for each of the plurality of queue pairs that are internal to the end node, wherein the data packet does not identify the plurality of queue pairs that are internal to the end node.

14. The computer program product of claim 13, wherein the data packet is received in a channel adapter of an end node, the end node being a final destination for the data packet within the system area network.

15. The computer program product of claim 13, further comprising:
    fourth instructions for decoding the data packet; and
    fifth instructions for storing the data packet in a multicast packet buffer.

16. The computer program product of claim 15, wherein the fourth instructions for decoding the data packet and the fifth instructions for storing the data packet in the multicast packet buffer are executed by port logic.

17. The computer program product of claim 15, wherein the fourth instructions for decoding the data packet and the fifth instructions for storing the data packet in the multicast packet buffer are executed by channel adapter logic.

18. The computer program product of claim 13, wherein each of the plurality of queue pairs comprises a send queue and a receive queue, and wherein the second instructions for identifying the plurality of queue pairs that are members of the multicast group that is identified by the identifier of the multicast group that is included in the received data packet include instructions for determining which queue pairs are associated with a destination local identifier in the data packet.

19. A computer program product comprising instructions stored in a non-transitory computer readable medium for multicasting a data packet in a system area network, the instructions comprising:
    first instructions for receiving the data packet, wherein the data packet includes an identifier of a multicast group;
    second instructions for identifying a plurality of queue pairs that are members of the multicast group, wherein each of the plurality of queue pairs comprises a send queue and a receive queue, and wherein the second instructions for identifying the plurality of queue pairs include instructions for determining which queue pairs are associated with a destination local identifier in the data packet; and
    third instructions for delivering the data packet to each of the plurality of queue pairs that are members of the multicast group, wherein the instructions for determining which queue pairs are associated with the destination local identifier include instructions for using a destination local identifier to queue pair lookup table.

20. The computer program product of claim 19, wherein the destination local identifier to queue pair lookup table contains a fixed number of queue pair identifier columns per destination local identifier.

21. The computer program product of claim 19, wherein the destination local identifier to queue pair lookup table contains a flexible number of queue pair identifier columns per destination local identifier.

22. The computer program product of claim 21, wherein one of the queue pair identifier columns associated with the destination local identifier serves as a link to another entry in the destination local identifier to queue pair lookup table.

23. An apparatus for multicasting a data packet in a system area network, the apparatus comprising a data processor coupled to a memory having instructions stored therein that cause the apparatus, when executed by the data processor, to perform steps of:
   receiving the data packet, wherein the data packet includes an identifier of a multicast group that identifies the multicast group;
   responsive to determining that the received data packet is a multicast packet based on the identifier of the multicast group included in the received data packet, identifying a plurality of queue pairs that are members of the multicast group that is identified by the identifier of the multicast group that is included in the received data packet; and
   delivering the data packet to each of the plurality of queue pairs that are identified as being members of the multicast group that is identified by the identifier of the multicast group that is included in the received data packet, wherein the data packet is received in a channel adapter of an end node, wherein the data packet originates from the end node, and wherein the delivering the data packet to each of the plurality of queue pairs that are identified as being members of the multicast group that is identified by the identifier of the multicast group that is included in the received data packet includes replicating the data packet for each of the plurality of queue pairs that are internal to the end node, wherein the data packet does not identify the plurality of queue pairs that are internal to the end node.

24. The apparatus of claim 23, wherein the data packet is received in a channel adapter of an end node, the end node being a final destination for the data packet within the system area network.

25. The apparatus of claim 23, wherein each of the plurality of queue pairs comprises a send queue and a receive queue, and wherein the identifying the plurality of queue pairs that are members of the multicast group that is identified by the identifier of the multicast group that is included in the received data packet includes determining which queue pairs are associated with a destination local identifier in the data packet.

26. The apparatus of claim 23, further comprising:
   decoding the data packet; and
   storing the data packet in a multicast packet buffer.

27. The apparatus of claim 26, wherein the decoding the data packet and storing the data packet in the multicast packet buffer are include port logic.

28. The apparatus of claim 26, wherein the decoding the data packet and storing the data packet in the multicast packet buffer include channel adapter logic.

* * * * *